United States Patent [19]

Gan et al.

[11] Patent Number: 5,776,635
[45] Date of Patent: Jul. 7, 1998

[54] TERNARY SOLVENT NONAQUEOUS ORGANIC ELECTROLYTE FOR ALKALI METAL ELECTROCHEMICAL CELLS

[75] Inventors: Hong Gan, E. Amherst; Esther S. Takeuchi, East Amherst, both of N.Y.

[73] Assignee: Wilson Greatbatch Ltd., Clarence, N.Y.

[21] Appl. No.: 710,382

[22] Filed: Sep. 16, 1996

[51] Int. Cl.$^6$ .................................................. H01M 10/40
[52] U.S. Cl. ......................................... 429/197; 429/218
[58] Field of Search ..................... 424/194, 197, 424/218

[56] References Cited

U.S. PATENT DOCUMENTS

| Re. 33,306 | 8/1990 | Hayashi et al. | 424/194 |
|---|---|---|---|
| 4,252,876 | 2/1981 | Koch | 429/197 |
| 4,327,166 | 4/1982 | Leger | 429/194 |
| 4,385,103 | 5/1983 | Louzos et al. | 429/197 |
| 4,399,204 | 8/1983 | Clark | 429/197 |
| 4,546,057 | 10/1985 | Broussely et al. | 429/218 |
| 4,913,988 | 4/1990 | Langan | 429/194 |
| 4,952,330 | 8/1990 | Leger et al. | 252/62.2 |
| 4,957,833 | 9/1990 | Daifuku et al. | 429/197 |
| 5,192,629 | 3/1993 | Guyomard et al. | 429/197 |
| 5,246,795 | 9/1993 | Meghed et al. | 429/185 |
| 5,272,022 | 12/1993 | Takami et al. | 429/197 |
| 5,292,601 | 3/1994 | Sugeno et al. | 429/197 |
| 5,296,318 | 3/1994 | Gozdz et al. | 429/192 |
| 5,310,553 | 5/1994 | Simon et al. | 429/212 |
| 5,407,762 | 4/1995 | Mitate et al. | 429/197 |
| 5,443,929 | 8/1995 | Yamamoto et al. | 429/224 |
| 5,472,810 | 12/1995 | Takeuchi et al. | 429/218 |
| 5,478,673 | 12/1995 | Funatsu | 429/197 |
| 5,516,340 | 5/1996 | Takeuchi et al. | 29/623.1 |
| 5,595,841 | 1/1997 | Suzuki | 429/217 |
| 5,626,985 | 5/1997 | Shoji et al. | 429/197 |
| 5,654,114 | 8/1997 | Kubota et al. | 429/218 |

*Primary Examiner*—Stephen Kalafut
*Attorney, Agent, or Firm*—Hodgson, Russ, Andrews, Woods & Goodyear LLP

[57] ABSTRACT

A nonaqueous electrolyte comprising a ternary solvent system preferably including a linear ether mixed with a high permittivity solvent and a low viscosity solvent, is described. This electrolyte is useful for activating an alkali metal/solid cathode electrochemical cell of the kind that typically powers implantable medical devices. The new electrolyte provides improved cell capacity under high current pulse discharge applications while decreasing cell swelling by about 20% in comparison to conventional nonaqueous organic electrolytes consisting of propylene carbonate and dimethoxyethane as the solvents.

65 Claims, 1 Drawing Sheet

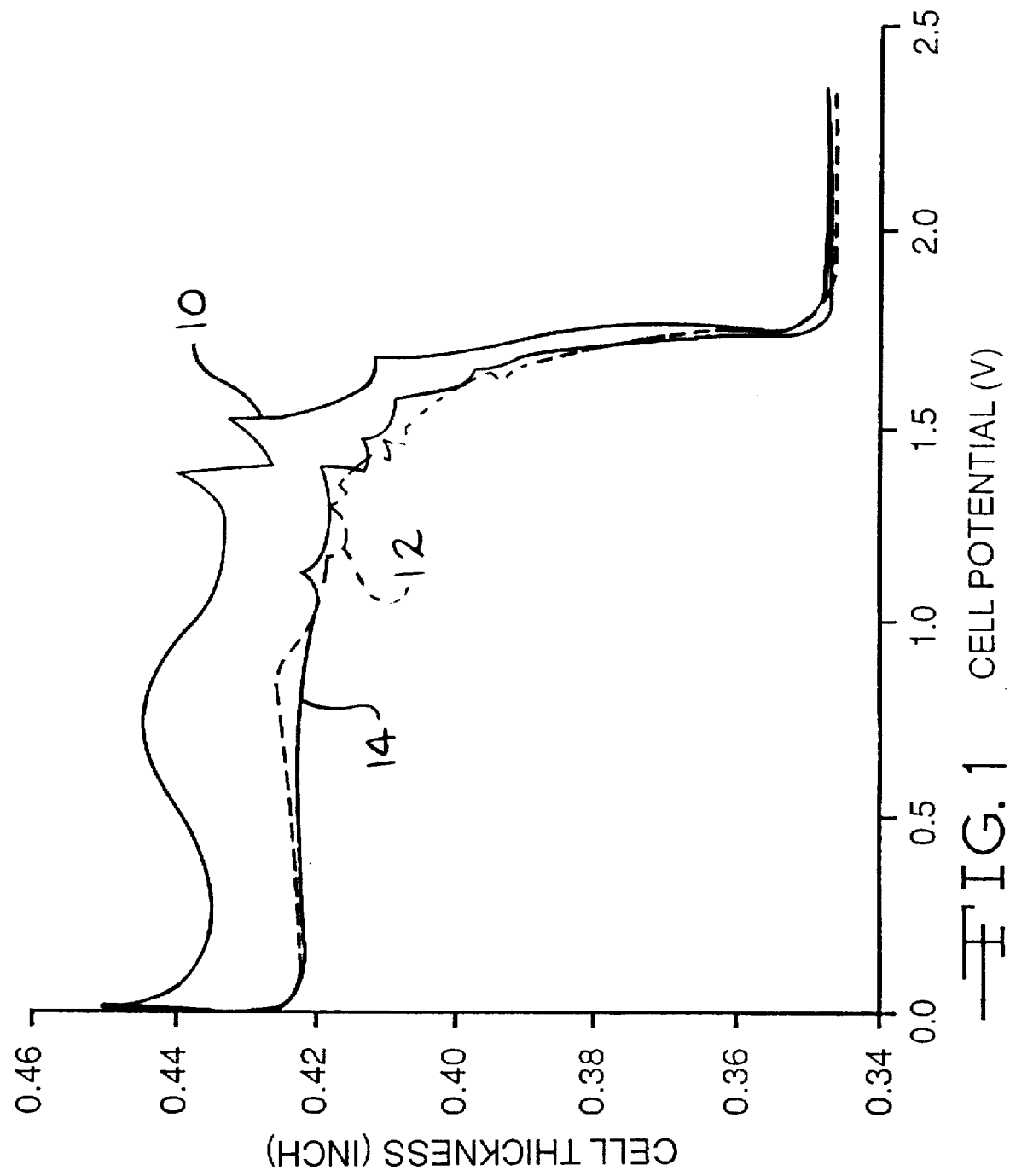

TERNARY SOLVENT NONAQUEOUS ORGANIC ELECTROLYTE FOR ALKALI METAL ELECTROCHEMICAL CELLS

BACKGROUND OF THE INVENTION

1. Field of the Invention

The present invention relates to the conversion of chemical energy to electrical energy, and more particularly, to a nonaqueous electrolyte electrochemical cell. The nonaqueous electrolyte comprises a ternary solvent system preferably including a linear ether solvent mixed with a high permittivity solvent and a low viscosity solvent.

2. Prior Art

The widespread use of high energy density alkali metal electrochemical cells is, in part, dependent on the development of highly conductive and stable nonaqueous organic electrolytes. Conventional nonaqueous organic electrolytes suitable for use with alkali metal electrodes are composed of an ion-forming salt, preferably an alkali metal salt with the alkali metal of the salt similar to the alkali metal comprising the electrode, dissolved in a solvent system comprising either a single organic solvent or a mixture of organic solvents. A general requirement of nonaqueous organic electrolytes is their stability toward both the anode and the cathode materials. For high rate alkali metal electrochemical cells such as lithium cells, the use of a highly conductive electrolyte is especially important. To achieve high electrolyte conductivity, the combination of two solvents, one with a high dielectric constant and one with a low viscosity, is generally used.

Typical highly conductive and stable electrolytes include propylene carbonate (PC) and 1,2-dimethoxyethane (DME). Propylene carbonate has a relatively high dielectric constant of about 64 and is preferably present in conventional electrolytes in an amount of about 10 to 50 volume percent, more preferably about 20 to 30 volume percent. The remainder of the conventional solvent mixture is typically 1,2-dimethoxyethane which functions as a relatively low viscosity solvent. A preferred electrolyte according to the prior art is 1.0M or 1.2M LiAsF$_6$ in a 50:50 mixture of, by volume, propylene carbonate and 1,2-dimethoxyethane, which has a conductivity of about 17.3 mS. This electrolyte is widely used in the battery industry and its successful application in a high rate, pulse dischargeable alkali metal/ mixed metal oxide defibrillator battery is one of the best examples.

In order to minimize the internal resistance during high current density discharge, an electrolyte with improved conductivity over that shown by the prior art electrolytes is desired. However, many electrolytes with improved conductivity (>17.3 mS) are not suitable for high rate, pulse discharge applications, i.e., for use in implantable medical devices such as a cardiac defibrillator and the like, due to various unfavorable characteristics. These include instability toward the anode, instability toward the cathode, or instability toward both electrodes, poor homogeneity, unacceptable voltage delay, high rate of self discharge and unacceptable cell swelling.

The present improved nonaqueous electrolyte for an alkali metal electrochemical cell comprises a ternary solvent system of at least one high permittivity solvent such as propylene carbonate, a low viscosity solvent such as 1,2-dimethoxyethane and a linear ether such as, for example, diisopropyl ether (DIPE). This improved electrolyte not only has high conductivity (>17.3 mS), but also exhibits good performance characteristics in all other noted categories.

U.S. Pat. No. 4,952,330 to Leger et al. discloses an alkali metal cell activated with a ternary solvent nonaqueous electrolyte comprising a linear aliphatic ether, a polymerizable component of a cyclic ether, and an alkylene carbonate. While DME and DIPE are both listed as suitable linear aliphatic ethers, this patent specifically teaches use of only one linear aliphatic ether in combination with propylene carbonate as the alkylene carbonate and a cyclic ether such as 1,3-dioxolane. This latter compound is stated as forming a protective film on the anode through reduction of the solvent to suppress the formation of lithium dendrite growth.

SUMMARY OF THE INVENTION

The object of the present invention is, therefore, to improve the performance of an alkali metal electrochemical cell such as a lithium cell by providing an improved nonaqueous electrolyte with high conductivity and good stability. A further object of this invention is to provide such an electrolyte in defibrillator batteries to improve the cell capacity under high current pulse discharge applications and at the same time to minimize the cell swelling characteristics typically associated with such power sources. These and other objects are achieved by using a new electrolyte comprising a ternary solvent system including a linear ether mixed with a high permittivity solvent and a low viscosity solvent according to the present invention to activate an alkali metal electrochemical cell.

In the present invention, the preferred anode is lithium metal and the preferred cathode is a transition metal oxide for example, silver vanadium oxide, Ag$_2$V$_4$O$_{11}$ (SVO) or copper silver vanadium oxide (CSVO). The preferred electrolytes include 1.0M to 1.4M LiAsF$_6$ or LiPF$_6$ as an ion-forming alkali metal salt dissolved in solvents containing at least one high permittivity solvent such as propylene carbonate and at least one low viscosity solvent, preferably a linear ether such as, diisopropyl ether (DIPE) combined with a second low viscosity solvent such as 1,2-dimethoxyethane.

BRIEF DESCRIPTION OF THE DRAWING

FIG. 1 is a graph showing comparable cell thickness versus potential for lithium/silver vanadium oxide cells activated with various nonaqueous electrolytes according to the prior art and the present invention.

DETAILED DESCRIPTION OF THE PREFERRED EMBODIMENTS

The electrochemical cell of the present invention comprises an anode of a metal selected from Groups IA, IIA or IIIB of the Periodic Table of the Elements, including lithium, sodium, potassium, etc., and their alloys and intermetallic compounds including, for example, Li—Si, Li—Al, Li—B and Li—Si—B alloys and intermetallic compounds. The preferred anode comprises lithium, and the more preferred anode comprises a lithium alloy such as a lithium-aluminum alloy. The greater the amount of aluminum present by weight in the alloy, the lower the energy density of the cell.

The form of the anode may vary, but preferably the anode is a thin metal sheet or foil of the anode metal, pressed or rolled on a metallic anode current collector, i.e., preferably comprising nickel, to form an anode component. In the exemplary cell of the present invention, the anode component has an extended tab or lead of the same material as the anode current collector, i.e., preferably nickel, integrally formed therewith such as by welding and contacted by a weld to a cell case of conductive metal in a case-negative electrical configuration. Alternatively, the anode may be formed in some other geometry, such as a bobbin shape, cylinder or pellet to allow an alternate low surface cell design.

The cathode is preferably of a solid material and the electrochemical reaction at the cathode involves conversion of ions which migrate from the anode to the cathode in atomic or molecular forms. The solid cathode material may comprise a metal element, a metal oxide, a mixed metal oxide and a metal sulfide, and combinations thereof. The metal oxide, the mixed metal oxide and the metal sulfide can be formed by the chemical addition, reaction, or otherwise intimate contact of various metal oxides, metal sulfides and/or metal elements, preferably during thermal treatment, sol-gel formation, chemical vapor deposition or hydrothermal synthesis in mixed states. The active materials thereby produced contain metals, oxides and sulfides of Groups IB, IIB, IIIB, IVB, VB, VIB, VIIB and VIII, which includes the noble metals and/or other oxide and sulfide compounds.

One preferred mixed metal oxide has the general formula $SM_xV_2O_y$ wherein SM is a metal selected from Groups IB to VIIB and VIII of the Periodic Table of Elements, wherein x is about 0.30 to 2.0 and y is about 4.5 to 6.0 in the general formula. By way of illustration, and in no way intended to be limiting, one exemplary cathode active material comprises silver vanadium oxide (SVO) having the general formula $Ag_xV_2O_y$ in any one of its many phases, i.e., β-phase silver vanadium oxide having in the general formula x=0.35 and y=5.8, γ-phase silver vanadium oxide having in the general formula x=0.74 and y=5.37 and ε-phase silver vanadium oxide having in the general formula x=1.0 and y=5.5, and combination and mixtures of phases thereof.

Another preferred composite cathode material includes $V_2O_z$ wherein z≦5 combined with $Ag_2O$ with silver in either the silver(II), silver(I) or silver(0) oxidation state and CuO with copper in either the copper(II), copper(I) or copper(0) oxidation state to provide the mixed metal oxide having the general formula $Cu_xAg_yV_2O_z$ (CSVO). Thus, this composite cathode active material may be described as a metal oxide-metal oxide-metal oxide, a metal-metal oxide-metal oxide, or a metal-metal-metal oxide and the range of material composition found for $Cu_xAg_yV_2O_z$ is preferably about 0.01≦x≦1.0, about 0.01≦y≦1.0 and about 5.01≦z≦6.5. Typical forms of CSVO are $Cu_{0.16}Ag_{0.67}V_2O_z$ with z being about 5.5 and $Cu_{0.5}Ag_{0.5}V_2O_z$ with z being about 5.75. The oxygen content is designated by z since the exact stoichiometric proportion of oxygen in CSVO can vary depending on whether the cathode material is prepared in an oxidizing atmosphere such as air or oxygen, or in an inert atmosphere such as argon, nitrogen and helium.

Additional cathode active materials useful with the present invention include manganese dioxide, lithium cobalt oxide, lithium nickel oxide, copper oxide, titanium disulfide, copper sulfide, iron sulfide, iron disulfide, copper vanadium oxide, fluorinated carbon, and mixtures thereof. Preferably, the cathode comprises from about 80 to about 99 weight percent of the cathode active material.

Cathode active materials prepared as described above are preferably mixed with a binder material such as a powdered fluoro-polymer, more preferably powdered polytetrafluoroethylene or powdered polyvinylidene fluoride present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium and stainless steel. The preferred cathode active mixture thus includes a powdered fluoro-polymer binder present at about 3 weight percent, a conductive diluent present at about 3 weight percent and about 94 weight percent of the cathode active material. The cathode active mixture may be in the form of one or more plates operatively associated with at least one or more plates of anode material, or in the form of a strip wound with a corresponding strip of anode material in a structure similar to a "jellyroll".

In order to prevent internal short circuit conditions, the cathode is separated from the Group IA, IIA or IIIB anode material by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the electrochemical cell. Illustrative separator materials include fabrics woven from fluoropolymeric fibers including polyvinylidene fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C.H. Dexter, Div., Dexter Corp.).

The electrochemical cell of the present invention further includes a nonaqueous, ionically conductive electrolyte which serves as a medium for migration of ions between the anode and the cathode electrodes during the electrochemical reactions of the cell. The electrochemical reaction at the electrodes involves conversion of ions in atomic or molecular forms which migrate from the anode to the cathode. Thus, nonaqueous electrolytes suitable for the present invention are substantially inert to the anode and cathode materials, and they exhibit those physical properties necessary for ionic transport, namely, low viscosity, low surface tension and wettability.

A suitable electrolyte has an inorganic, ionically conductive salt dissolved in a nonaqueous solvent. More preferably, the electrolyte includes an ionizable alkali metal salt dissolved in a mixture of aprotic organic solvents comprising a first, low viscosity solvent, which is preferably a linear ether, a second low viscosity solvent and a high permittivity solvent. The inorganic, ionically conductive salt serves as the vehicle for migration of the anode ions to intercalate into the cathode active material, and has the general formula $MM'F_6$ or $MM'F_4$ wherein M is an alkali metal similar to the alkali metal comprising the anode and M' is an element selected from the group consisting of phosphorous, arsenic, antimony and boron. Examples of salts yielding $M'F_6$ are: hexafluorophosphate ($PF_6$), hexafluoroarsenate ($AsF_6$) and hexafluoroantimonate ($SbF_6$) while tetrafluoroborate ($BF_4$) is exemplary of salts yielding $M'F_4$. Thus, in the case of the anode comprising lithium, the alkali metal salt comprises lithium hexafluorophosphate, lithium hexafluoroarsenate, lithium hexafluoroantimonate or lithium tetrafluoroborate dissolved in a suitable ternary solvent mixture. Alternatively, the corresponding sodium or potassium salts may be used. Other inorganic salts useful with the present invention include $LiClO_4$, $LiAlCl_4$, $LiGaCl_4$, $LiC(SO_2CF_3)_3$, $LiN(SO_2CF_3)_2$, $LiSO_3F$, $LiB(C_6H_5)_4$ and $LiCF_3SO_3$, and mixtures thereof.

Low viscosity solvents useful with the present invention include esters, linear and cyclic ethers and dialkyl carbonates such as tetrahydrofuran (THF), methyl acetate (MA), digltriglytriglyme, tetraglyme, dimethyl carbonate (DMC), diethyl carbonate, 1,2-dimethoxyethane (DME) and mixtures thereof, and useful high permittivity solvents include cyclic carbonates, cyclic esters and cyclic amides such as propylene carbonate (PC), ethylene carbonate (EC), acetonitrile, dimethyl sulfoxide, dimethyl formamide, dimethyl acetamide, γ-butyrolactone (GBL) and N-methyl-pyrolidinone (NMP) and mixtures thereof. Propylene carbonate (PC) is a preferred high permittivity solvent and 1,2-dimethoxyethane is one of the preferred low viscosity solvents of the present invention.

In that respect, it is known that electrolyte solvent decomposition contributes to alkali metal/mixed metal oxide cell swelling. For example, in a lithium/silver vanadium oxide (Li/SVO) cell activated with 1.0M LiAsF$_6$ in a 50:50 percent mixture of, by volume, PC:DME according to the prior art, propene has been found to be the major component of the gaseous products. It is believed that propylene carbonate in the electrolyte is catalytically decomposed to form propene and lithium carbonate according to the following reaction:

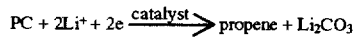

PC + 2Li$^+$ + 2e $\xrightarrow{\text{catalyst}}$ propene + Li$_2$CO$_3$

In general, propene formation is believed to be proportional to the PC concentration. Presumably, propene formation can be reduced during the discharge of an alkali metal/mixed metal oxide electrochemical cell by lowering the percentage of propylene carbonate in the electrolyte. However, only decreasing the percentage of propylene carbonate in the electrolyte has been determined not to help in controlling cell swelling. Instead, the present invention is directed to partially replacing either PC or DME with a second, low viscosity solvent such as a simple, linear ether. Unexpectedly, this results in a decrease in swelling at end-of-life (EOL) of cell discharge by about 20% of the swelling typically experienced in conventional alkali metal electrochemical cells activated with the prior art 50:50 percent mixture of, by volume, PC:DME, no matter what the volume percent of PC is in the electrolyte.

Linear ethers useful as the second, low viscosity solvent in the electrolyte of the present invention include diethyl ether, ethylpropyl ether, ethyl isopropyl ether, ethyl butyl ether, ethyl tert-butyl ether, dipropyl ether, diisopropyl ether, dibutyl ether, diisobutyl ether, disec-butyl ether, methylpropyl ether, methyl iso-propyl ether, methylbutyl ether, methy sec-butyl ether and methyl tert-butyl ether, and mixtures thereof. The most preferred linear ether is diisopropyl ether (DIPE).

The present invention is, therefore, generally directed to at least partially replacing PC and/or DME with a second, low viscosity solvent, preferably a linear ether, the most preferred linear ether being diisopropyl ether, in electrolytes useful for activating alkali metal cells to thereby improve the conductivity of the new electrolyte and concomitantly the cell discharge performance. Thus, propylene carbonate is preferably present in the electrolyte at about 20 to about 50 percent, by volume, and diisopropyl ether as the preferred second, low viscosity solvent is preferably present at about 5 percent to about 20 percent, by volume, remainder dimethoxyethane. At less than about 5 volume percent, the beneficial effects of DIPE are not pronounced enough to aid in reducing the cell swelling while maintaining high conductivity. Above about 20 volume percent, diisopropyl ether reaches its limit of miscibility, and homogeneity is important in any solvent system. In the present invention, the anode is preferably lithium metal and the preferred electrolyte is 1.0M to 1.4M LiAsF$_6$ or LiPF$_6$ dissolved in a ternary aprotic solvent comprising propylene carbonate (PC), dimethoxyethane (DME) and diisopropyl ether (DIPE) in a respective 30:55:15 volume percent mixture. In addition to not compromising discharge performance for the sake of improved conductivity, the ternary solvent electrolytes of the present invention are also stable toward the alkali metal anode and the solid cathode materials as evidenced by heat dissipation measurements.

The preferred form of the electrochemical cell of the present invention is a case-negative design wherein the anode/cathode couple is inserted into a conductive metal casing such that the casing is connected to the anode current collector in a case-negative configuration, as is well known to those skilled in the art. A preferred material for the casing is titanium although stainless steel, mila steel, nickel-plated mila steel and aluminum are also suitable. The casing header comprises a metallic lid having an opening to accommodate the glass-to-metal seal/terminal pin feedthrough for the cathode electrode. The anode electrode is preferably connected to the case or the lid. An additional opening is provided for electrolyte filling. The casing header comprises elements having compatibility with the other components of the electrochemical cell and is resistant to corrosion. The cell is thereafter filled with the electrolyte solution described hereinabove and hermetically sealed such as by closewelding a stainless steel plug over the fill hole, but not limited thereto. The cell of the present invention can also be constructed in a case-positive design.

The following examples describe the manner and process of manufacturing an electrochemical cell according to the present invention, and they set forth the best mode contemplated by the inventors of carrying out the invention, but they are not to be construed as limiting.

EXAMPLE I

Various nonaqueous solvent mixtures comprising propylene carbonate (PC), 1,2-dimethoxyethane (DME) and a linear ether, particularly diisopropyl ether (DIPE), were mixed as listed in Table 1. The ternary solvent electrolytes according to the present invention, i.e., electrolytes 3, 4, 7 and 8 exhibited similar or improved conductivities in comparison to conventional, binary solvent electrolytes 1 and 5. The conductivity of these electrolytes was determined at 37° C.

TABLE 1

| | Electrolyte Conductivity | | | |
|---|---|---|---|---|
| Electrolyte | [LiAsF$_6$] M | [LiPF$_6$] M | Solvent Ratio PC:DME:DIPE | Conductivity (mmho/cm) |
| 1 | | 1.2 | 50:50:0 | 18.2 |
| 2 | | 1.0 | 50:35:15 | 16.7 |
| 3 | | 1.2 | 30:55:15 | 18.3 |
| 4 | | 1.2 | 20:65:15 | 18.3 |
| 5 | 1.0 | | 50:50:0 | 17.3 |
| 6 | 1.0 | | 50:35:15 | 16.4 |
| 7 | 1.2 | | 30:55:15 | 17.9 |
| 8 | 1.2 | | 20:65:15 | 18.2 |

EXAMPLE II

A test group of cells was constructed, each having lithium anode material pressed on a nickel current collector screen and silver vanadium oxide cathode material pressed on an aluminum current collector screen. A prismatic cell stack assembly configuration with two layers of microporous membrane propylene separator sandwiched between the anode and the cathode was prepared. The electrode assembly was then hermetically sealed in a stainless steel casing in a case-negative configuration and the cells were activated with various ones of the electrolytes 1 to 8 set forth in Table 1. In particular, some of the cells in this example, designated as reference cells, were activated with electrolyte 1 and other cells were activated with one of the ternary electrolytes according to the present invention, specifically electrolyte 2 (1.0M LiPF$_6$ in a 50:35:15 percent mixture of, by volume, PC:DME:DIPE) or electrolyte 3 (1.2M LiPF$_6$ in a 30:55:15 percent mixture of, by volume, PC:DME:DIPE).

All of the cells were subjected to a pre-discharge protocol consisting of a burn-in discharge followed by an acceptance pulse train. During burn-in, a constant resistance load of 2.49 Kohm was applied to the cells to deplete them of approximately 1% of their theoretical capacity. Following burn-in, the cells were acceptance pulse discharged. The pulse train consisted of four 10 second 23.3 mA/cm$^2$ pulses with 15 second rests between each pulse. The cells were then stored at 37° C. for one week. Heat dissipation of these cells was measured by microcalorimetry and the results are listed in Table 2.

Following the above pre-discharge protocol, the cells in this example were discharged by applying a pulse train every thirty minutes. The pulse train consisted of four 10 second pulses (23.2 mA/cm$^2$) with 15 second rests between each pulse. The delivered capacities to several voltage limits are also listed in Table 2.

TABLE 2

Cell Discharge Capacity and Heat Dissipation

| Electrolyte | Heat Dissipation* (μ Watt) | Capacity (mAh) at Cut Off* | | |
|---|---|---|---|---|
| | | 2.0 V | 1.7 V | 1.5 V |
| 1 | 17.7 | 1544 | 1751 | 1843 |
| 2 | 14.2 | 1424 | 1731 | 1838 |
| 3 | 14.6 | 1542 | 1776 | 1872 |

*Average of Five Cells.

After the above tests, these cells were discharged under a 5.1 Kohm resistor until they reached 0.0V. Cell thickness was monitored periodically. The results are presented in FIG. 1. In particular, curve 10 was constructed from the average discharge of the cells activated with the prior art electrolyte 1 comprising a 50:50 percent mixture of, by volume, PC:DME, curve 12 was constructed from the average discharge of the cells activated with the electrolyte according to the present invention comprising a 50:35:15 percent mixture of, by volume, PC:DME:DIPE and curve 14 was constructed from the average discharge of the cells activated with the electrolyte according to the present invention comprising a 30:55:15 percent mixture of, by volume, PC:DME:DIPE.

For those cells activated with the ternary solvent electrolytes 2 and 3 according to the present invention, improvements in cell performance are clearly evident in terms of increased stability (low heat dissipation), increased delivered capacity (for electrolyte 3), and decreased cell swelling by about 20% at the EOL of cell discharge in comparison to Li/SVO cells activated with conventional electrolytes, i.e. electrolyte 1. Electrolytes 4 and 8 were not tested because while their conductivities were clearly acceptable, 20 volume percent of propylene carbonate results in an electrolyte having borderline homogeneity.

EXAMPLE III

Hermetically sealed Li/SVO defibrillator batteries were constructed similar to those described in Example II and were activated with electrolytes 1 and 3, respectively. After being subjected to the pre-discharge protocol consisting of the burn-in discharge followed by the acceptance pulse testing described in Example II, these cells were discharged by applying pulse trains at 37° C. once every 8 weeks over a 17.4 Kohm background load. The pulse trains consisted of four 10 second pulses (23.2 mA/cm$^2$) with 15 second rests between each pulse. The pulse voltages in each pulse train are listed in Table 3 wherein Ppre1 indicates the voltage before the application of the pulse train, P1min indicates the minimum voltage during the first pulse of the pulse train, P4min indicates the minimum voltage of the fourth pulse of the pulse train and P1min–P4min is calculated from the minimum voltage of the first pulse minus the minimum voltage of the fourth pulse of the pulse train.

For those cells activated with electrolyte 3 (1.2M LiPF$_6$ in a 30:55:15 percent mixture of, by volume, PC:DME:DIPE), the pulse minimum potentials are higher than those of the control cells activated with electrolyte 1 (1.2M LiPF$_6$ in a 50:50 percent mixture of, by volume, PC:DME). In addition, cells with electrolyte 3 also had a lower polarization voltage drop as indicated by the pulse 1 minimum minus the pulse 4 minimum (P1min–P4min) presented in the last column of Table 3.

TABLE 3

Cell Discharge Potentials*

| Pulse Train | Electrolyte | Ppre1 (V) | P1min (V) | P4min (V) | P1min – P4min |
|---|---|---|---|---|---|
| 1 | 1 | 3.238 | 2.713 | 2.565 | 0.148 |
|   | 3 | 3.241 | 2.718 | 2.593 | 0.125 |
| 2 | 1 | 3.184 | 2.633 | 2.476 | 0.157 |
|   | 3 | 3.188 | 2.640 | 2.507 | 0.133 |
| 3 | 1 | 2.980 | 2.504 | 2.388 | 0.116 |
|   | 3 | 2.985 | 2.517 | 2.417 | 0.100 |
| 4 | 1 | 2.740 | 2.357 | 2.297 | 0.060 |
|   | 3 | 2.740 | 2.368 | 2.317 | 0.051 |
| 5 | 1 | 2.573 | 2.211 | 2.195 | 0.016 |
|   | 3 | 2.573 | 2.240 | 2.224 | 0.016 |
| 6 | 1 | 2.529 | 2.116 | 2.088 | 0.028 |
|   | 3 | 2.529 | 2.162 | 2.134 | 0.028 |

*Average of five cells.

EXAMPLE IV

Instead of using aluminum cathode current collector screens, titanium cathode screens were used in this example. The hermetically sealed cells in this example were assembled in a similar manner as the cells described in Example II except that some cells, designated as reference cells, were activated with electrolyte 5 (1.0M LiAsF$_6$ in a 50:50 percent mixture of, by volume, PC:DME) while the remaining test cells were activated with electrolyte 7 (1.2M LiAsF$_6$ in a 30:55:15 percent mixture of, by volume, PC:DME:DIPE).

After being subjected to the pre-discharge protocol consisting of the burn-in discharge followed by the acceptance pulse testing described in Example II, the cells in this example were discharged by applying pulse trains at 37° C.

over 11.0 Kohm and 17.4 Kohm background loads, respectively. The pulse trains consisted of four 10 second pulses (18.4 mA/cm$^2$) with 15 second rests between each pulse. The resulting pulse voltages are listed in Table 4.

TABLE 4

Cell Discharge Potentials*

| Load (Kohm) | Electrolyte | Ppre1 (V) | P1min (V) | P4min (V) | P1min − P4min |
|---|---|---|---|---|---|
| 11.0[a] | 5 | 3.217 | 2.622 | 2.584 | 0.038 |
|  | 7 | 3.217 | 2.657 | 2.626 | 0.031 |
| 17.4[b] | 5 | 3.225 | 2.654 | 2.608 | 0.046 |
|  | 7 | 3.225 | 2.672 | 2.643 | 0.029 |

[a]: Average of two cells.
[b]: Average of six cells.

For those cells activated with electrolyte 7 according to the present invention, the improvement in cell performance is clearly evident in terms of higher pulse minimum potentials and lower polarization voltage drop during high current pulse discharge while exhibiting excellent conductivity.

From the above examples, it is clearly demonstrated that ternary solvents according to the present invention containing a high permittivity solvent such as PC, a first, low viscosity solvent such as DME and a second, low viscosity solvent comprising a linear ether (DIPE for example) present several advantages over the conventional PC/DME binary solvent system. These include stability in the form of lower heat dissipation (Table 2), decreased cell swelling at EOL (FIG. 1), higher pulse minimum voltage (Tables 3 and 4), and lower polarization voltage drop during pulse discharging (Tables 3 and 4).

It is appreciated that various modifications to the inventive concepts described herein may be apparent to those skilled in the art without departing from the spirit and the scope of the present invention defined by the hereinafter appended claims.

What is claimed is:

1. An electrochemical cell, which comprises:
   a) an anode comprising an alkali metal;
   b) a cathode comprising a cathode active material; and
   c) an electrolyte solution activating the anode and the cathode, the electrolyte comprising a ternary, nonaqueous solvent mixture comprising:
      i) a linear mono-ether as a first solvent having a ratio of carbon atoms to the functional oxygen atom greater than 4:1;
      ii) a second linear ether as a second solvent; and
      iii) a third solvent selected from the group consisting of a cyclic carbonate, a cyclic ester and a cyclic amide, and mixtures thereof.

2. The electrochemical cell of claim 1 wherein the first solvent is present in the solvent mixture at about 5 to 20 volume percent.

3. The electrochemical cell of claim 1 wherein the linear mono-ether is selected from the group consisting of ethylpropyl ether, ethyl isopropyl ether, ethylbutyl ether, ethyl tert-butyl ether, dipropyl ether, diisopropyl ether, dibutyl ether, diisobutyl ether, disec-butyl ether, methylbutyl ether, methy secbutyl ether and methyl tert-butyl ether, and mixtures thereof.

4. The electrochemical cell of claim 1 wherein the first solvent is diisopropyl ether present in the solvent mixture at about 5 to 20 volume percent.

5. The electrochemical cell of claim 1 wherein the electrolyte includes an alkali metal salt dissolved therein.

6. The electrochemical cell of claim 5 wherein the alkali metal salt has the general formula MM'F$_6$ or MM'F$_4$ and wherein M is an alkali metal similar to the alkali metal comprising the anode and M' is an element selected from the group consisting of phosphorous, arsenic, antimony and boron.

7. The electrochemical cell of claim 5 wherein the alkali metal salt comprising the electrolyte solution is selected from the group consisting of LiPF$_6$, LiAsF$_6$, LiSbF$_6$, LiBF$_4$, LiClO$_4$, LiAlCl$_4$, LiGaCl$_4$, LiC(SO$_2$CF$_3$)$_3$, LiN (SO$_2$CF$_3$)$_2$, LiCF$_3$SO$_3$, LiSO$_3$F, LiB(C$_6$H$_5$)$_4$ and mixtures thereof.

8. The electrochemical cell of claim 1 wherein the second solvent is selected from the group consisting of 1,2-dimethoxyethane, diglyme, triglyme and tetraglyme, and mixtures thereof.

9. The electrochemical cell of claim 1 wherein the third solvent is selected from the group consisting of propylene carbonate, ethylene carbonate, γ-butyrolactone, N-methylpyrrolidinone, dimethyl sulfoxide, acetonitrile, dimethyl formamide and dimethyl acetamide, and mixtures thereof.

10. The electrochemical cell of claim 1 wherein the electrolyte includes the ternary, nonaqueous solvent mixture comprised of propylene carbonate, dimethoxyethane and diisopropyl ether.

11. The electrochemical cell of claim 10 wherein the propylene carbonate, dimethoxyethane and diisopropyl ether are present in a ratio of about 3:5.5:1.5, by volume, respectively.

12. The electrochemical cell of claim 1 wherein the anode comprises either lithium or a lithium-aluminum alloy.

13. The electrochemical cell of claim 1 wherein the cathode is comprised of the cathode active material selected from the group consisting of silver vanadium oxide, copper silver vanadium oxide, manganese dioxide, lithium cobalt oxide, lithium nickel oxide, copper oxide, copper sulfide, iron sulfide, iron disulfide, fluorinated carbon, titanium disulfide and copper vanadium oxide, and mixtures thereof.

14. The electrochemical cell of claim 1 wherein the cathode comprises from about 80 to about 99 weight percent of the cathode active material.

15. The electrochemical cell of claim 1 wherein the cathode further comprises a binder material and a conductor additive.

16. The electrochemical cell of claim 15 wherein the binder material is a fluoro-resin powder.

17. The electrochemical cell of claim 15 wherein the conductive additive is selected from the group consisting of carbon, graphite powder and acetylene black and metallic powder selected from the group consisting of titanium, aluminum, nickel and stainless steel, and mixtures thereof.

18. The electrochemical cell of claim 1 wherein the cathode is comprised of about 0 to 3 weight percent carbon, about 1 to 5 weight percent of a powder fluoro-resin and about 94 weight percent of the cathode active material.

19. The electrochemical cell of claim 1 associated with an implantable medical device.

20. An electrochemical cell, which comprises:
   a. an anode comprised of an alkali metal;
   b. a cathode including a mixed metal oxide comprised of vanadium oxide and a second metal "SM" selected from the group consisting of Groups IB, IIB, IIIB, IVB, VIB, VIIB and VIII of the Periodic Table of the Elements, the mixed metal oxide having the general formula SM$_x$V$_2$O$_y$ wherein $0.30 \leq x \leq 2.0$ and $4.5 \leq y \leq 6.0$; and
   c. an electrolyte solution operatively associated with the anode and the cathode, the electrolyte comprised of a ternary, nonaqueous solvent mixture comprising:

i) a linear mono-ether as a first solvent having a ratio of carbon atoms to the functional oxygen atom greater than 4:1;

ii) a second linear ether as a second solvent; and iii) a third solvent selected from the group consisting of a cyclic carbonate, a cyclic ester and a cyclic amide, and mixtures thereof.

21. The electrochemical cell of claim 20 wherein the linear mono-ether is selected from the group consisting of ethylpropyl ether, ethyl isopropyl ether, ethylbutyl ether, ethyl tert-butyl ether, dipropyl ether, diisopropyl ether, dibutyl ether, diisobutyl ether, disec-butyl ether, methylbutyl ether, methyl sec-butyl ether and methyl tert-butyl ether, and mixtures thereof.

22. The electrochemical cell of claim 20 wherein the electrolyte includes the ternary, nonaqueous solvent mixture is comprised of propylene carbonate, dimethoxyethane and diisopropyl ether in a ratio of about 3:5.5:1.5, by volume, respectively.

23. An electrochemical cell, which comprises:

a) an anode;

b) a cathode including a mixed metal oxide comprised of vanadium oxide and a mixture of copper and a second metal "SM" selected from the group consisting of Groups IB, IIB, IIIB, IVB, VIB, VIIB, and VIII of the Periodic Table of the Elements, the mixed metal oxide having the general formula $Cu_xSM_yV_2O_z$ wherein $0.01 \leq x \leq 1.0$, $0.01 \leq y \leq 1.0$ and $5.01 \leq z \leq 6.5$; and c) an electrolyte solution operatively associated with the anode and the cathode, the electrolyte comprised of a ternary, nonaqueous solvent mixture comprising:

i) a linear mono-ether as a first solvent having a ratio of carbon atoms to the functional oxygen atom greater than 4:1;

ii) a second linear ether as a second solvent; and iii) a third solvent selected from the group consisting of a cyclic carbonate, a cyclic ester and a cyclic amide, and mixtures thereof.

24. The electrochemical cell of claim 23 wherein the linear mono-ether is selected from the group consisting of ethylpropyl ether, ethyl isopropyl ether, ethylbutyl ether, ethyl tert-butyl ether, dipropyl ether, diisopropyl ether, dibutyl ether, diisobutyl ether, disec-butyl ether, methylbutyl ether, methy secbutyl ether and methyl tert-butyl ether, and mixtures thereof.

25. The electrochemical cell of claim 20 wherein the electrolyte includes the ternary, nonaqueous solvent mixture is comprised of propylene carbonate, dimethoxyethane and diisopropyl ether in a ratio of about 3:5.5:1.5, by volume, respectively.

26. The electrochemical cell of claim 23 wherein in the general formula $x \leq y$.

27. In an alkali metal anode, solid cathode electrochemical cell activated with a nonaqueous electrolyte, the improvement in the electrolyte comprising:

a ternary, nonaqueous solvent mixture comprised of:

a) a linear mono-ether as a first solvent having a ratio of carbon atoms to the functional oxygen atom greater than 4:1;

b) a second linear ether as a second solvent; and c) a third solvent selected from the group consisting of a cyclic carbonate, a cyclic ester and a cyclic amide, and mixtures thereof.

28. The electrochemical cell of claim 27 wherein the first solvent is present in the solvent mixture at about 5 to 20 volume percent.

29. The electrochemical cell of claim 27 wherein the linear mono-ether is selected from the group consisting of ethylpropyl ether, ethyl isopropyl ether, ethylbutyl ether, ethyl tert-butyl ether, dipropyl ether, diisopropyl ether, dibutyl ether, disobutyl ether, disec-butyl ether, methylbutyl ether, methy secbutyl ether and methyl tert-butyl ether, and mixtures thereof.

30. The electrochemical cell of claim 27 wherein the first solvent is diisopropyl ether present in the solvent mixture at about 5 to 20 volume percent.

31. The electrochemical cell of claim 27 wherein the electrolyte includes the ternary, nonaqueous solvent mixture comprised of propylene carbonate, dimethoxyethane and diisopropyl ether.

32. The electrochemical cell of claim 31 wherein the propylene carbonate, dimethoxyethane and diisopropyl ether are present in a ratio of about 3:5.5:1.5, by volume, respectively.

33. A method of providing an electrochemical cell activated with a nonaqueous electrolyte, comprising the steps of:

a) providing a casing;

b) providing an anode comprising an alkali metal;

c) providing a solid cathode comprising a cathode active material, wherein the anode and the cathode are disposed inside the casing in electrical association with each other; and d) activating the anode and the cathode with the nonaqueous electrolyte, including the steps of:

i) providing a linear mono-ether as a first solvent having a ratio of carbon atoms to the functional oxygen atom greater than 4:1;

ii) selecting a second solvent from the group consisting of a cyclic carbonate, a cyclic ester and a cyclic amide, and mixtures thereof; and iii) mixing a second linear ether as a third solvent with the first solvent and the second solvent.

34. The method of claim 33 including providing the first solvent in the solvent mixture at about 5 to 20 volume percent.

35. The method of claim 33 including selecting the linear mono-ether from the group consisting of ethylpropyl ether, ethyl isopropyl ether, ethylbutyl ether, ethyl tert-butyl ether, dipropyl ether, disopropyl ether, dibutyl ether, disobutyl ether, disec-butyl ether, methylbutyl ether, methyl sec-butyl ether and methyl tert-butyl ether, and mixtures thereof.

36. The method of claim 33 including providing the first solvent as diisopropyl ether present in the solvent mixture at about 5 to 20 volume percent.

37. The method of claim 33 including providing the electrolyte having an alkali metal salt dissolved therein.

38. The method of claim 37 including providing the alkali metal salt having the general formula $MM'F_6$ or $MM'F_4$ wherein M is an alkali metal similar to the alkali metal comprising the anode and M' is an element selected from the group consisting of phosphorous, arsenic, antimony and boron.

39. The method of claim 37 including selecting the alkali metal salt comprising the electrolyte from the group consisting of $LiPF_6$, $LiAsF_6$, $LiSbF_4$, $LiBF_4$, $LiClO_4$, $LiAlCl_4$, $LiGaCl_4$, $LiC(SO_2CF_3)_3$, $LiN(SO_2CF_3)_2$, $LiCF_3SO_3$, $LiSO_3F$, $LiB(C_6H_5)_4$ and mixtures thereof.

40. The method of claim 33 including selecting the third solvent from the group consisting of 1,2-dimethoxyethane, diglyme, triglyme and tetraglyme, and mixtures thereof.

41. The method of claim 33 including selecting the second solvent from the group consisting of propylene carbonate, ethylene carbonate, γ-butytolactone, N-methylpyrrolidinone, dimethyl sulfoxide, acetonitrile, dimethyl formamide and dimethyl acetamide, and mixtures thereof.

42. The method of claim 33 including providing the nonaqueous electrolyte comprising propylene carbonate, dimethoxyethane and diisopropyl ether.

43. The method of claim 42 including providing the propylene carbonate, dimethoxyethane and diisopropyl ether in a ratio of about 3:5.5:1.5, by volume, respectively.

44. The method of claim 33 including providing the anode comprising either lithium or a lithium-aluminum alloy.

45. The method of claim 44 including providing the aluminum comprising up to about 50%, by weight, of the anode alloy.

46. The method of claim 33 including selecting the cathode active material from the group consisting of silver vanadium oxide, copper silver vanadium oxide, manganese dioxide, lithium cobalt oxide, lithium nickel oxide, copper oxide, copper sulfide, iron sulfide, iron disulfide, fluorinated carbon, titanium disulfide and copper vanadium oxide, and mixtures thereof.

47. The method of claim 33 including providing the cathode comprising from about 80 to about 99 weight percent of the cathode active material.

48. The method of claim 33 including providing the cathode comprising a binder material and a conductive additives.

49. The method of claim 48 including providing the cathode comprising about 0 to 3 weight percent carbon, about 1 to 5 weight percent of a powder fluoro-resin and about 94 weight percent of the cathode active material.

50. The method of claim 33 including associating the electrochemical cell with an implantable medical device to power the same.

51. A method of providing a pulse dischargeable electrochemical cell with reduced cell swelling, comprising the steps of:
 a) providing a casing;
 b) providing an anode comprising an alkali metal;
 c) providing a solid cathode comprising a cathode active material, wherein the anode and the cathode are disposed inside the casing in electrical association with each other; and
 d) activating the anode and the cathode with a nonaqueous electrolyte, comprising:
  i) providing diisopropyl ether as a first solvent;
  ii) selecting a second solvent from the group consisting of a cyclic carbonate, a cyclic ester and a cyclic amide, and mixtures thereof; and
  iii) mixing a second linear ether as a third solvent with the diisopropyl ether and the second solvent.

52. The method of claim 51 including providing the electrolyte comprising propylene carbonate as the second solvent, dimethoxyethane as the third solvent and diisopropyl ether in a ratio of about 3:5.5:1.5, respectively.

53. The electrochemical cell of claim 1 wherein the cathode comprises a solid cathode active material contacted to a current collector selected from the group consisting of aluminum and titanium.

54. An electrochemical cell, which comprises:
 a) an anode comprising an alkali metal;
 b) a cathode comprising a cathode active material; and
 c) an electrolyte solution activating the anode and the cathode, the electrolyte comprising a ternary, nonaqueous solvent mixture comprising:

i) a linear mono-ether having a ratio of carbon atoms to the functional oxygen atom greater than 4:1 as a first solvent;
 ii) a second linear ether as a second solvent; and
 iii) a third solvent selected from the group consisting of a cyclic carbonate, a cyclic ester and a cyclic amide, and mixtures thereof.

55. The electrochemical cell of claim 54 wherein the linear mono-ether is selected from the group consisting of ethyl propyl ether, ethyl isopropyl ether, ethyl butyl ether, ethyl tert-butyl ether, dipropyl ether, diusopropyl ether, dibutyl ether, diisobutyl ether, disec-butyl ether, methyl butyl ether, methyl sec-butyl ether and methyl tert-butyl ether, and mixtures thereof.

56. A method of providing an electrical discharge comprising a current pulse discharging from an electrochemical cell activated with a nonaqueous electrolyte, comprising the steps of:
 a) providing a casing;
 b) providing an anode comprising an alkali metal;
 c) providing a solid cathode comprising a cathode active material, wherein the anode and the cathode are disposed inside the casing in electrical association with each other;
 d) activating the anode and the cathode with the nonaqueous electrolyte, including the steps of:
  i) providing a linear mono-ether as a first solvent having a ratio of carbon atoms to the functional oxygen atom greater than 4:1;
  ii) selecting a second solvent from the group consisting of a cyclic carbonate, a cyclic ester and a cyclic amide, and mixtures thereof; and
  iii) mixing a second linear ether as a third solvent with the first solvent and the second solvent; and
 e) discharging the cell to deliver at least one current pulse of a short duration burst of electrical current of a significantly greater amplitude than that of a prepulse current immediately prior to the pulse.

57. The method of claim 56 including discharging a pulse train of at least two current pulses delivered in succession with or without an open circuit period between the pulses.

58. The method of claim 57 wherein the current pulses are of about 23.2 mA/cm$^2$.

59. The method of claim 56 including selecting the linear mono-ether from the group consisting of ethyl propyl ether, ethyl isopropyl ether, ethyl butyl ether, ethyl tert-butyl ether, dipropyl ether, diisopropyl ether, dibutyl ether, diisobutyl ether, disec-butyl ether, methyl butyl ether, methyl sec-butyl ether and methyl tert-butyl ether, and mixtures thereof.

60. The method of claim 56 including selecting the second solvent from the group consisting of propylene carbonate, ethylene carbonate, γ-butytolactone, N-methylpyrrolidinone, dimethyl sulfoxide, acetonitrile, dimethyl formamide and dimethyl acetamide, and mixtures thereof.

61. The method of claim 56 including selecting the third solvent from the group consisting of 1,2-dimethoxyethane, diglyme, triglyme and tetraglyme, and mixtures thereof.

62. A method of providing an electrical discharge comprising a current pulse discharging from an electrochemical cell, comprising the steps of:
 a) providing a casing;
 b) providing an anode comprising an alkali metal;
 c) providing a solid cathode comprising a cathode active material, wherein the anode and the cathode are disposed inside the casing in electrical association with each other;

d) activating the anode and the electre with a nonaqueous electrolyte, comprising:
  i) providing diisopropyl ether as a first solvent;
  ii) selecting a second solvent from the group consisting of a cyclic carbonate, a cyclic ester and a cyclic amide, and mixtures thereof; and
  iii) mixing a second linear ether as a third solvent with the diisopropyl ether and the second solvent; and
e) discharging the cell to deliver at least one current pulse of a short duration burst of electrical current of a significantly greater amplitude than that of a prepulse current immediately prior to the pulse.

63. The method of claim 62 including discharging a pulse train of at least two current pulses delivered in succession with or without an open circuit period between the pulses.

64. The method of claim 63 wherein the current pulses are of about 23.2 mA/cm$^2$.

65. The method of claim 62 including providing the electrolyte comprising propylene carbonate as the second solvent, dimethoxyethane as the third solvent and diisopropyl ether in a ratio of about 3:5.5:1.5, respectively.

* * * * *

UNITED STATES PATENT AND TRADEMARK OFFICE
CERTIFICATE OF CORRECTION

PATENT NO. : 5,776,635
DATED : July 7, 1998
INVENTOR(S) : Gan, et al

It is certified that error appears in the above-identified patent and that said Letters Patent is hereby corrected as shown below:

Column 11, line 45, please delete "20", and insert --23--.

Column 11, line 48, after 3:5 please delete " .", and insert -- ,--.

Signed and Sealed this

Sixteenth Day of February, 1999

Attest:

Attesting Officer

Acting Commissioner of Patents and Trademarks

UNITED STATES PATENT AND TRADEMARK OFFICE
CERTIFICATE OF CORRECTION

PATENT NO. : 5,776,635
DATED : July 7, 1998
INVENTOR(S) : Gan et al.

It is certified that error appears in the above-identified patent and that said Letters Patent is hereby corrected as shown below:

Col. 6, line 19 - "mila" should be -- mild --.

Col. 6, line 20 - "mila" should be -- mild --.

Signed and Sealed this

Tenth Day of April, 2001

Attest:

NICHOLAS P. GODICI

Attesting Officer

Acting Director of the United States Patent and Trademark Office